UNITED STATES PATENT OFFICE.

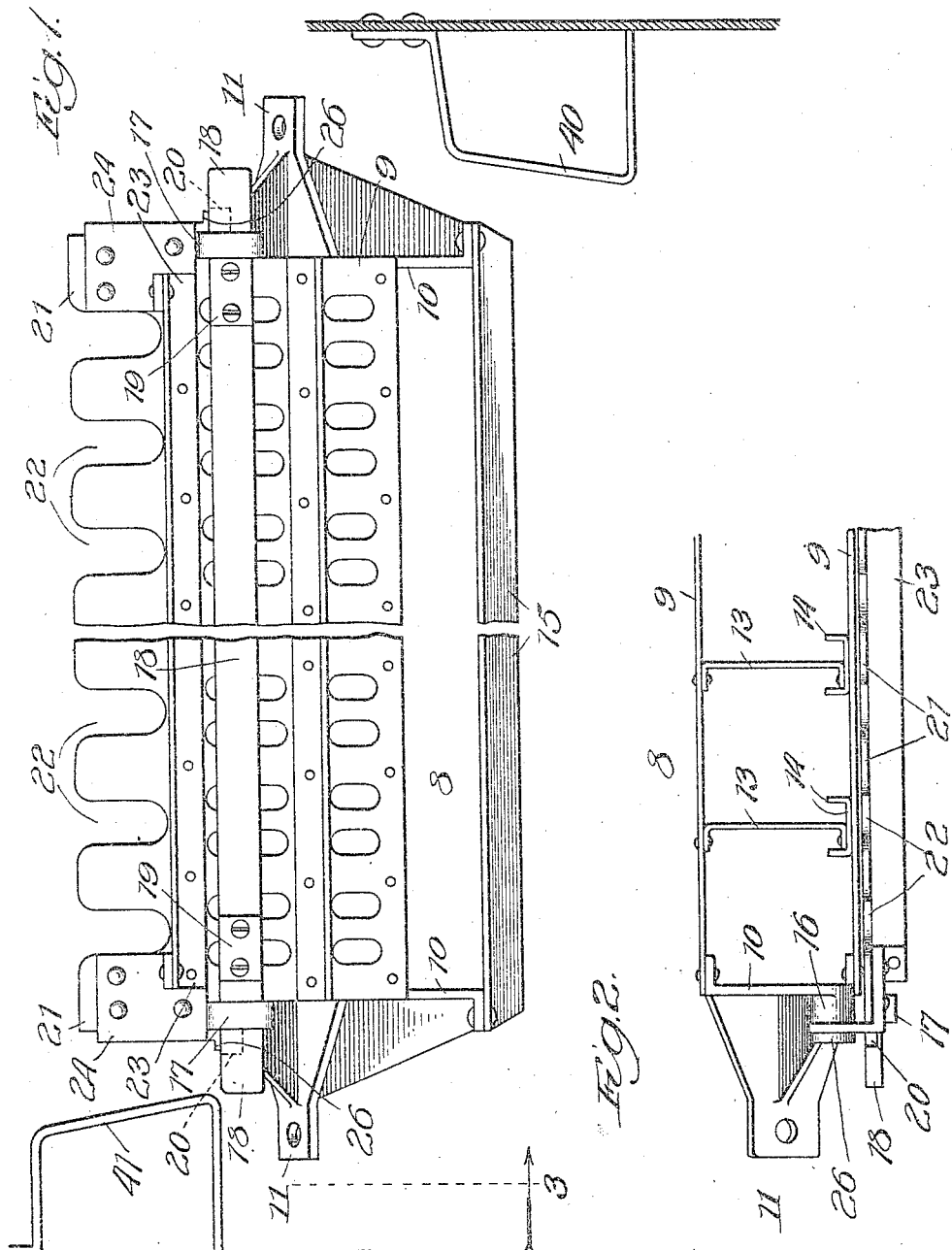

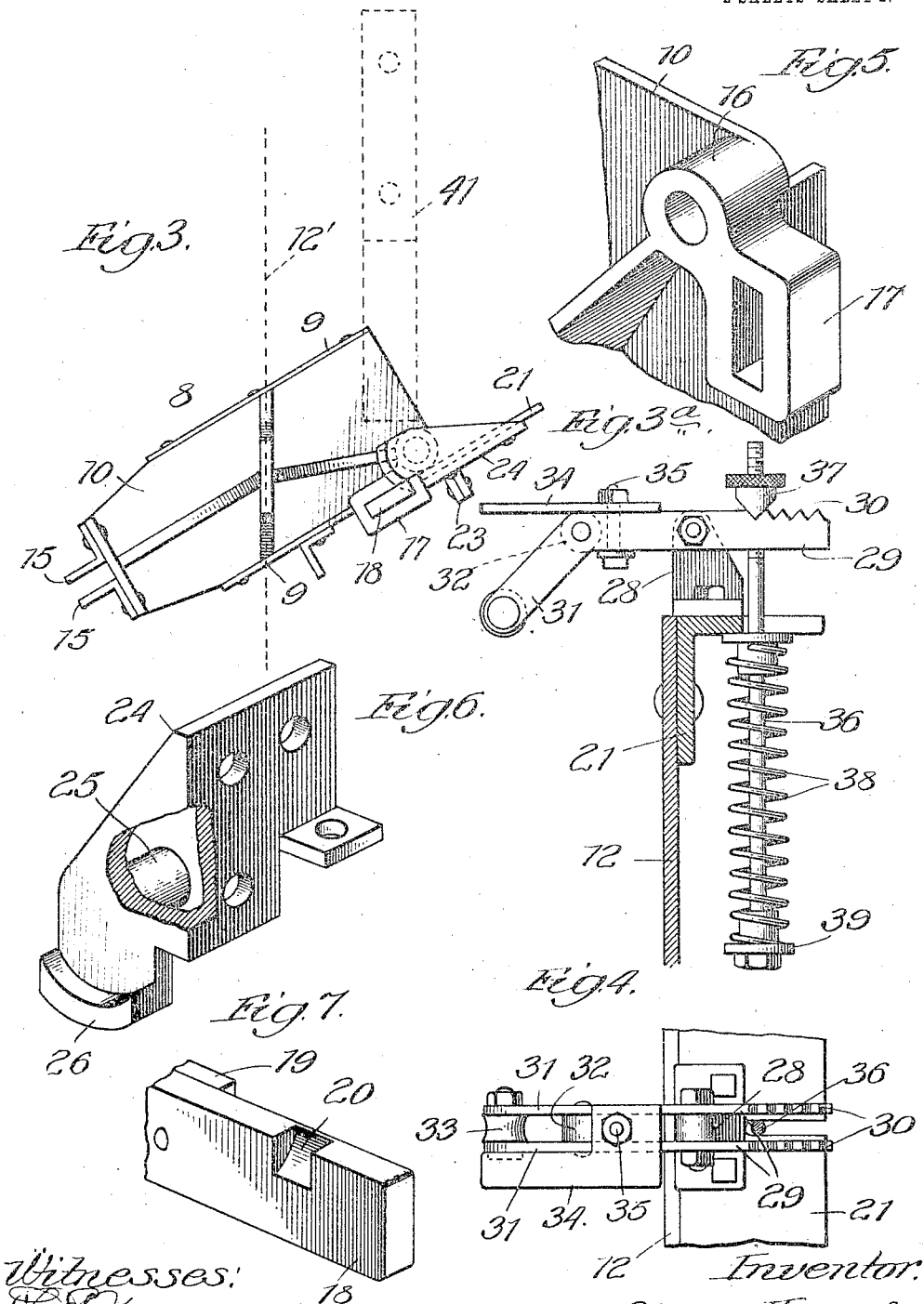

ALFRED HANNAFORD, OF CHICAGO, ILLINOIS.

RACK FOR BOTTLE-CLEANING MACHINES.

1,055,632.

Specification of Letters Patent.   Patented Mar. 11, 1913.

Application filed August 3, 1912.   Serial No. 713,072.

*To all whom it may concern:*

Be it known that I, ALFRED HANNAFORD, a citizen of the United States, residing at Chicago, in the county of Cook and State of Illinois, have invented a new and useful Improvement in Racks for Bottle-Cleaning Machines, of which the following is a specification.

My invention relates to an improvement in racks for bottle-cleaning machines of the type shown and described in United States Letters Patent No. 920,564, granted to Sigmund L. Goldman May 4, 1909, in which the rack-body is provided with a hinged door containing a row of bottle-neck openings and adapted to be automatically closed after filling the rack with bottles, for retaining them while the rack is passing through the machine, and opened by cam-action to permit the bottles to discharge after being cleaned.

The object of my improvement is to simplify operation of the door to adapt it to open by gravity, by locking it, after the rack has been filled with bottles to be cleaned, through the medium of a bar longitudinally shiftable in one direction for that purpose, and in the opposite direction for unlocking the door to permit it to open for the discharge of the cleansed bottles; the shifting means being cams in the paths of the opposite ends of the bar, and means being provided in the path of the open door for closing it automatically prior to locking it after the filling operation.

In the accompanying drawings, Figure 1 shows the rack with its door open and provided with my improvement, by a broken view in elevation, the view presenting in a diagrammatic way, stationary cams in the paths of the opposite ends of the locking-bar for shifting it successively in opposite directions; Fig. 2 is a broken view of the rack presenting its mouth; Fig. 3 shows the rack by an end view, and Fig. 3ᵃ shows a broken section of the tank carrying a spring-cushioned device in the path of the open door for closing it; Fig. 4 shows the device of Fig. 3ᵃ by a plan view, but with the spring-adjusting means omitted; Fig. 5 is a broken perspective view of one of the two similar ends or heads of the rack; Fig. 6 is a similar view of one of the two similar heads provided on opposite ends of the door to coöperate with the locking-bar, and Fig. 7 is a broken perspective view of one of the two similar ends of the bar provided with a recess for the door-unlocking purpose.

The rack 8 shown is of substantially the same construction as to its body-portion, except as to a certain feature hereinafter pointed out, as that illustrated and described in United States Letters Patent No. 1,012,843, granted December 26, 1911, to Sigmund L. Goldman. It comprises perforate sides 9, end-heads 10 having reinforced ears 11 projecting from their outer faces to be united to endless chains, one of which is indicated at 12′ in Fig. 3, forming the vertically traveling conveyer in the tank 12 of the machine, and perforate partitions 13 extending at intervals between the sides to form bottle-pockets. The additional feature referred to is a U-shaped strip 14 extending along one edge of each partition 13 to narrow the pockets for relatively small bottles, which will fit between these strips, while larger bottles will bear against the edges presented by the strips. Furthermore the bottom of the rack-body is shown to be formed by two parallel angle-bars 15 (Fig. 3) spaced apart and connecting the heads 10.

Each of two opposite corners of the heads 10 is formed with an outwardly-projecting journal-bearing 16 and a guide-loop 17 adjacent thereto; and in these loops is supported near its ends a locking-bar 18, adapted to be shifted lengthwise in its bearings 17 to the extent permissible by stops 19, 19 on its outer face near each end, to abut against the inner faces of the bearings. Adjacent to each stop 19, in the opposite face of the locking-bar, is formed a recess 20 for the door-unlocking purpose hereinafter explained.

The door or gate 21 is a plate provided in one edge with a series of U-shaped recesses 22 for permitting protrusion through them of the necks of bottles in the rack-pockets; and a reinforcing angle-bar 23 extends along the back of the plate at the bases of the recesses or openings.

On each end 10 of the rack-body is rigidly fastened a head 24 (Fig. 6) of angular shape, provided with an inwardly-projecting trunnion 25 to work in a bearing 16, and with a stop-forming shoe 26 to enter a bar-recess 20 for unlocking the door.

In use, the rack is one of a series of racks extending, at proper intervals, between conveyer-forming chains in a tank 12 and to which the racks are fastened by riveting through their ears 11. Following, now, one rack through the tank: As represented in Fig. 1, the rack has attained the filling side of the machine with the door 21 open, the position of the bar 18, with its right-hand stop 19 abutting against the adjacent loop 17, being that of registering the unlocking recesses 20 with the shoes 26. When the rack has been filled with bottles, in its continued downward movement on the filling side of the machine, the door is first closed and then locked. For closing it, a suitable device, such as that illustrated in Fig. 3ª, is provided. This device comprises an angle-iron support 27 riveted to a wall of the tank 12 and carrying a bracket 28, to opposite sides of which are fulcrumed between their ends similar arms 29, 29, each having a series of ratchet-teeth 30 on one end and a downwardly-inclined extension 31 at its opposite end, these extensions being spaced apart by an interposed block at 32 and by an anti-friction roller at 33. On the upper edges of the arms seats a finger 34, being fastened by a bolt 35 passing between the arms. A rod 36 carrying a V-shaped nut 37 on its upper threaded end is hung by the nut in corresponding teeth of the ratchets 30, and is surrounded by a coiled spring 38 confined between a head 39 on its lower end and the horizontal member of the angle-bar 27. By setting the nut in the ratchets 30 farther toward their outer ends, the leverage of the spring against the arms 29 may be increased. In the downward movement of the filled rack, the outer edge of the open door encounters the finger 34 which raises and partially closes it, the spring 38 cushioning the encounter to avoid jar and the roller 33 completing the closure gently, by engaging the angle-bar 23. In the continued downward travel of the rack, a cam 40 projecting from the tank-wall into the path of an end of the bar 18, shifts the latter lengthwise to remove its recesses 20 out of registration with the shoes 26, which thus abut against the bar causing the latter to lock the door against opening on its hinges. The rack, in its continued travel, attains the discharging side of the machine, wherein it moves upwardly; and just prior to reaching the point for discharging the cleaned bottles, the end of the bar 18 opposite that encountered by the cam 40, encounters another cam 41 in its path in the tank, and is thereby shifted longitudinally to register the recesses 20 with the stop-shoes 26, thus unlocking the door and permitting it to be swung on its hinges to open it by the weight against it of the bottles in the rack, which thereupon discharge therefrom. After the discharge, while the rack is continuing its upward movement in the tank, the door is free to close by gravity; but when the rack begins again to travel downwardly on the opposite or filling side, the door will then open by gravity to prepare the rack for filling, whereupon the door will encounter the closing device in its path, and the closing and locking actions heretofore described will be repeated.

I realize that considerable variation is possible in the details of construction thus specifically shown and described and I do not intend by illustrating a single, specific or preferred embodiment of my invention to be limited thereto; my intention being in the following claims to claim protection upon all the novelty there may be in my invention as broadly as the state of the art will permit.

What I claim as new and desire to secure by Letters Patent is—

1. In combination with a bottle-rack body, a door hinged thereto and provided with a stop, and a locking-bar provided with a recess for said stop and supported in bearings on said body to be shifted lengthwise in opposite directions to move said recess into and out of registration with said stop for unlocking and locking the door.

2. In combination with a bottle-rack body, a door hinged thereto and provided with a stop, bearings on said body near its opposite ends, a locking-bar provided with a recess and supported in the bearings to be shifted lengthwise in opposite directions to move said recess into and out of registration with said stop for unlocking and locking the door, and stops on said bar for limiting its movements.

3. In combination, a bottle-rack body provided on its opposite ends with journal-bearings and guide-bearings, a door having end-heads provided with trunnions working in the journal-bearings to hinge the door in place, stops on the ends of the door, and a locking-bar provided with recesses and supported in said guide-bearings to be shifted lengthwise in opposite directions to move said recesses into and out of registration with said stops for unlocking and locking the door.

4. In combination with a bottle-rack body, journal-bearings and guide-bearings on opposite ends of said body, a door having end-heads provided with trunnions working in the journal-bearings to hinge the door in place, stop-shoes on said heads, a locking-bar provided with recesses and supported in said guide-bearings to be shifted lengthwise in opposite directions to move said recesses into and out of registration with said shoes for unlocking and locking the door, and stops on said bar coöperating with said guide-bearings to limit the movements of said bar.

5. In a bottle-rack, a rack-body having partitions extending at intervals between the sides to form a series of bottle-pockets between the ends of said body, and U-shaped reducing strips extending in said body along the edges of said partitions.

ALFRED HANNAFORD.

In presence of—
  J. G. ANDERSON,
  R. A. SCHAEFER.